US010567230B1

(12) United States Patent
Song et al.

(10) Patent No.: US 10,567,230 B1
(45) Date of Patent: Feb. 18, 2020

(54) TOPOLOGY INFORMATION FOR NETWORKS

(71) Applicant: Juniper Networks, Inc., Sunnyvale, CA (US)

(72) Inventors: Dai Song, Milpitas, CA (US); Puneet Jain, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 257 days.

(21) Appl. No.: 14/866,175

(22) Filed: Sep. 25, 2015

(51) Int. Cl.
*H04L 12/24* (2006.01)

(52) U.S. Cl.
CPC .................................. *H04L 41/12* (2013.01)

(58) Field of Classification Search
None
See application file for complete search history.

(56) References Cited

U.S. PATENT DOCUMENTS

| 9,374,285 | B1* | 6/2016 | Ramasubramanian ...................... H04L 41/12 |
| 9,755,956 | B1 | 9/2017 | Song et al. |
| 10,182,002 | B1 | 1/2019 | Song et al. |
| 2003/0046425 | A1* | 3/2003 | Lee ..................... H04L 12/1877 709/238 |
| 2004/0172467 | A1* | 9/2004 | Wechter .................. H04L 41/12 709/224 |
| 2006/0002311 | A1* | 1/2006 | Iwanaga .............. H04L 12/4675 370/254 |
| 2008/0219184 | A1 | 9/2008 | Fowler et al. |
| 2008/0291922 | A1 | 11/2008 | Sultan et al. |
| 2010/0309816 | A1 | 12/2010 | Diab et al. |
| 2011/0167269 | A1 | 7/2011 | Baykal et al. |
| 2011/0305450 | A1* | 12/2011 | Pan ........................ H04L 45/28 398/8 |
| 2012/0023409 | A1* | 1/2012 | Gvirtsman .............. H04L 41/12 715/735 |
| 2012/0191875 | A1* | 7/2012 | Kano .................... H04L 61/103 709/245 |
| 2013/0250810 | A1* | 9/2013 | Ho .......................... H04L 41/12 370/255 |
| 2014/0064286 | A1* | 3/2014 | K.S. .................... H04L 12/4679 370/395.53 |
| 2015/0207677 | A1 | 7/2015 | Choudhury et al. |
| 2015/0271169 | A1 | 9/2015 | Seligson et al. |

(Continued)

*Primary Examiner* — Jeffrey M Rutkowski
*Assistant Examiner* — Mehedi S Aley
(74) *Attorney, Agent, or Firm* — Harrity & Harrity, LLP

(57) ABSTRACT

A device may receive a first network topology message from a network device. The first network topology message may include first network topology information associated with the network device in a first set of fields of the first network topology message. The device may generate a second network topology message. The second network topology message may include second network topology information associated with the device in a first set of fields of the second network topology message. The first set of fields of the second network topology message may correspond to the first set of fields of the first network topology message. The second network topology message may include the first network topology information associated with the network device in a second set of fields of the second network topology message. The device may provide the second network topology message.

20 Claims, 8 Drawing Sheets

(56) References Cited

U.S. PATENT DOCUMENTS

| | | | |
|---|---|---|---|
| 2015/0319043 A1* | 11/2015 | Dibirdi | H04L 41/0806 370/254 |
| 2016/0080254 A1* | 3/2016 | Zhou | H04L 12/6418 370/392 |
| 2016/0094866 A1* | 3/2016 | Frazzini | H04N 21/2668 725/10 |
| 2016/0291838 A1* | 10/2016 | Tashiro | G06F 3/04812 |
| 2017/0104670 A1* | 4/2017 | Song | H04L 12/6418 |

* cited by examiner

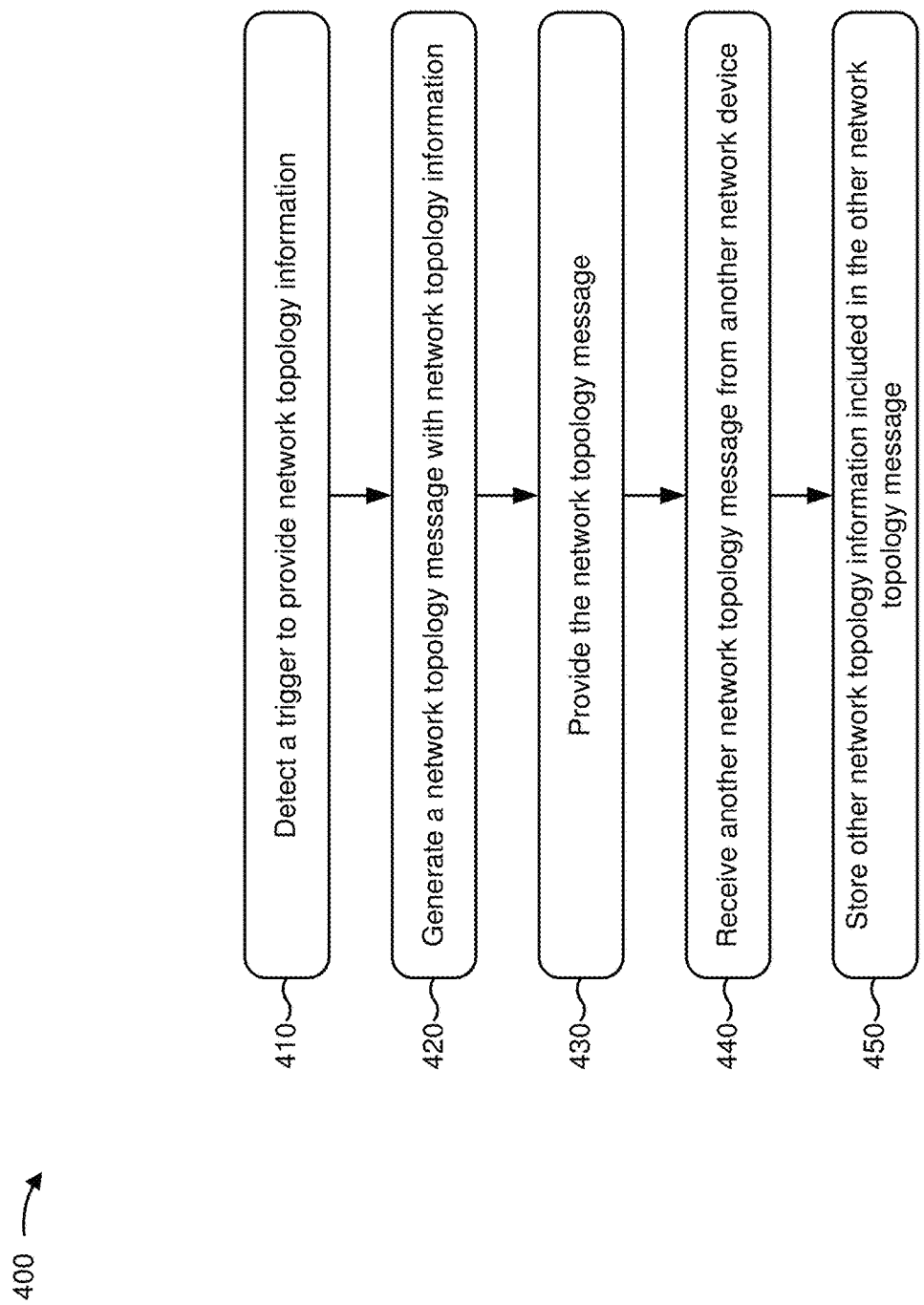

TOPOLOGY INFORMATION FOR NETWORKS

BACKGROUND

A communications protocol, such as a link layer discovery protocol (LLDP) may be utilized by a network device to provide information regarding an identity of the network device, a capability of the network device, or the like. For example, a first network device may transmit an LLDP message to a second network device identifying a chassis identifier associated with the first network device, one or more port identifiers associated with network ports of the first network device, or the like.

SUMMARY

According to some possible implementations, a device may include one or more processors. The one or more processors may receive a first network topology message from a network device. The first network topology message may include first network topology information associated with the network device in a first set of fields of the first network topology message. The one or more processors may generate a second network topology message including second network topology information associated with the device in a first set of fields of the second network topology message. The first set of fields of the second network topology message may correspond to the first set of fields of the first network topology message. The second network topology message may include the first network topology information associated with the network device in a second set of fields of the second network topology message. The one or more processors may provide the second network topology message.

According to some possible implementations, the non-transitory computer-readable medium may store one or more instructions that, when executed by one or more processors of a device, may cause the one or more processors to receive a first link layer discovery protocol (LLDP) message. The first LLDP message may include network topology information relating to one or more network devices. The network topology information relating to the one or more network devices may be included in an organizationally specific type-length value (TLV) field of the first LLDP message. A network device, of the one or more network devices, may lack a connection to a network management device to provide network topology information relating to the network device. The one or more instructions, when executed by one or more processors of a device, may cause the one or more processors to store the network topology information relating to the one or more network devices as stored network topology information. The one or more instructions, when executed by one or more processors of a device, may cause the one or more processors to transmit a second LLDP message. The second LLDP message may include the stored network topology information included in an organizationally specific TLV field of the second LLDP message.

According to some possible implementations, a method may include receiving, by a device, a message including network topology information associated with a set of network devices. The message may include a mandatory field. The mandatory field may include a portion of the network topology information associated with a particular network device, of the set of network devices, that generated the message. The optional field may include a portion of the network topology information associated with one or more network devices, of the set of network devices, to which the device is not connected. The method may include processing, by the device, the message to obtain the network topology information. The method may include providing, by the device, the network topology information for display based on processing the message to obtain the network topology information.

BRIEF DESCRIPTION OF THE DRAWINGS

FIG. 4 is a flow chart of an example process for determining a network topology associated with a set of network devices.

DETAILED DESCRIPTION

The following detailed description of example implementations refers to the accompanying drawings. The same reference numbers in different drawings may identify the same or similar elements.

A set of network devices (e.g. network nodes) may be utilized for communication via a network. For example, a first network device (e.g., a first endpoint network device) may receive information for communication to a second network device (e.g., a second endpoint network device). The first network device may transmit the information to the second network device via one or more other network devices (e.g., one or more intermediate network devices). The set of network devices may communicate via a particular communications protocol, such as link layer discovery protocol (LLDP) or the like. For example, the first network device may transmit an LLDP message to another network device that neighbors the first network device (e.g., without an intervening network device located between the first network device and the other network device in a network path). The LLDP message may include one or more type-length value (TLV) fields identifying the first network device (e.g., a chassis identifier), information identifying one or more network ports of the first network device (e.g., a port identifier), or the like.

A network management device may be utilized for visualization of the set of network devices, control of the set of network devices, or the like. For example, the network management device may cause information to be transmitted via a particular network path of a set of network paths. As another example, the network management device may provide, for display, information identifying the set of network devices, information identifying a particular network device causing a network outage, or the like. The network management device may be required to be directly connected to each network device of the set of network devices, and may obtain topology information regarding a network topology of the network utilizing the connection to each network device.

However, connecting the network management device to each intermediate network device, of the set of network devices, may become impractical as the quantity of intermediate network devices increases. Moreover, as the network topology changes (e.g., intermediate network devices are disconnected from the network, intermediated network devices are added to the network, etc.), delays may be experienced in updating connections to each intermediate network device. Implementations, described herein, may utilize configurable information of a communications protocol to facilitate providing network topology information to a network management device without requiring that the network management device be directly connected to each intermediate network device of a set of network devices.

Figure 1:
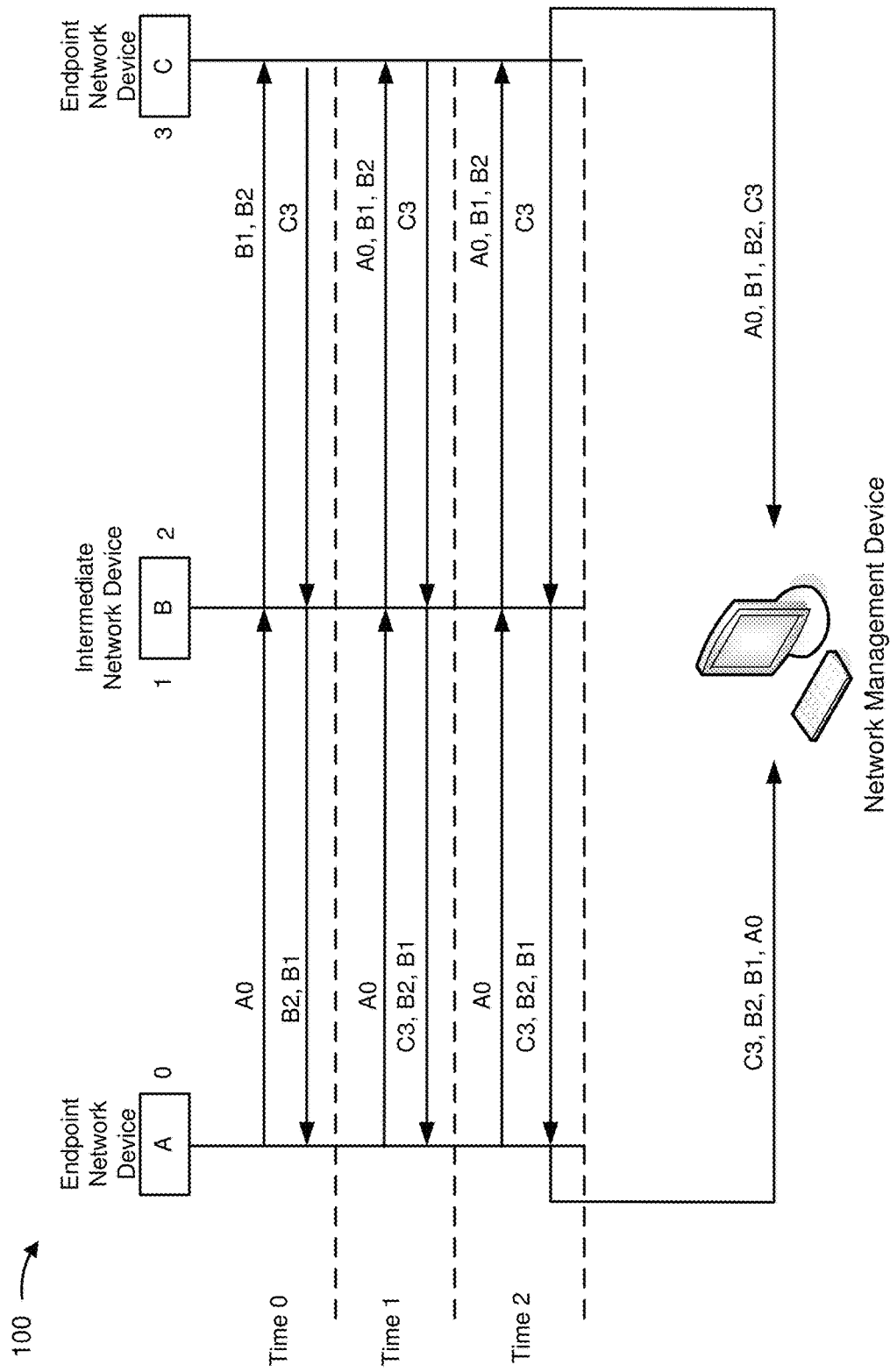
FIG. 1 is a diagram of an overview of an example implementation described herein.

FIG. 1 is a diagram of an overview of an example implementation 100 described herein. As shown in FIG. 1, example implementation 100 includes a network management device and a set of network devices. The set of network devices includes a first endpoint network device (e.g., endpoint network device "A"), an intermediate network device (e.g., intermediate network device "B"), and a second endpoint device (e.g., endpoint network device "C"). Collectively, the set of network devices are associated with a network path of a network. Endpoint network device A may be associated with a network port (e.g., "0"). Intermediate network device B may be associated with a first network port (e.g., "1") and a second network port (e.g., "2"). Endpoint network device B may be associated with a network port (e.g., "3"). Assume that endpoint network devices A and C are connected to the network management device and that intermediate network device B is not connected to the network management device.

As further shown in FIG. 1, at a first time interval (e.g., "Time 0"), the set of network devices may transmit a first set of messages associated with identifying a network topology. For example, endpoint network device A may transmit network topology information to intermediate network device B. The network topology information may be transmitted via an LLDP message that includes a first mandatory TLV field identifying endpoint network device A and a second mandatory TLV field identifying the network port of endpoint network device A (e.g., "A0"). As further shown in FIG. 1, intermediate network device B may transmit, to endpoint network device C, an LLDP message identifying intermediate network device B and network ports of network device B (e.g., "B1, B2").

In some implementations, the set of network devices may be synchronized, and the first set of messages may be transmitted concurrently at a particular time during the first time interval. Additionally, or alternatively, the set of network devices may not be synchronized, and the first set of messages may be transmitted by corresponding network devices at different times during the first time interval.

As further shown in FIG. 1, endpoint network device C may transmit an LLDP message identifying endpoint network device C and the network port of endpoint network device C (e.g., "C3"). Similarly, intermediate network device B may transmit, to endpoint network device A, an LLDP message identifying intermediate network device B and network ports of network device B (e.g., "B2, B1"). The set of messages may be associated with a directionality of the network path. For example, when intermediate network device B transmits the LLDP message toward endpoint network device C, intermediate network device B may indicate a first order associated with the network path as "B1, B2." In contrast, when intermediate network device B transmits the LLDP message toward endpoint network device A, intermediate network device B may indicate a second (e.g., reverse) order associated with the network path as "B2, B1." In this way, a network device identifies a directionality of the network path.

The set of network devices may store received topology information and information associated with a directionality of the network path. For example, endpoint network device A may store "B2, B1" for propagation in a leftward direction. As another example, intermediate network device B may store "A0" for propagation in a rightward direction and "C3" for propagation in a leftward direction. As another example, endpoint network device C may store "B1, B2" for propagation in a rightward direction.

Although implementations, described herein, may be described in directional terms ("rightward," "leftward," "right-located," "left-located," etc.), these terms are used strictly for explanatory purposes and are not intended to convey any real sense of direction. Thus, these terms can easily be replaced with any other term illustrative of direction, such as upstream, downstream, or the like.

As further shown in FIG. 1, at a second time interval (e.g., "Time 1"), the set of network devices may transmit a second set of messages identifying network topology information. The second set of messages may include information identifying the network topology of the network. For example, a message may include information identifying a network topology of a network device sending the message and may include stored network topology information intended for propagation in a direction that the message is being sent.

As an example, endpoint network device A may transmit "A0" rightward to intermediate network device B to identify the network topology associated with endpoint network device A, but may not include stored network topology information associated with another network device (based on storing "B2, B1" for propagation in the leftward direction). In contrast, intermediate network device B may transmit "A0, B1, B2" rightward to endpoint network device C to identify the network topology associated with intermediate network device C and to propagate rightward stored network topology information associated with endpoint network device A, which was received and stored during the first time interval. In this case, intermediate network device B may identify "B2" via mandatory TLV fields (e.g., a portion of the LDDP message required in each LLDP message) and may identify "A0, B1, B2" via an optional TLV field (e.g., a portion of the LLDP message not required in each LLDP message, such as an organizationally specific TLV field that may be configured for utilization by a set of network devices). In this way, intermediate network device B utilizes a configurable portion of an LLDP message to propagate network topology information while maintaining required information in the mandatory portion of the LLDP message.

As further shown in FIG. 1, endpoint network device C may transmit "C3" leftward to intermediate network device B to identify the network topology associated with endpoint network device C, but may not include stored network topology information associated with another network device (based on storing "B1, B2" for propagation in the rightward direction). In contrast, intermediate network device B may transmit "C3, B2, B1" leftward to endpoint network device A via an LLDP message. Endpoint network device A and/or endpoint network device C may determine that the LLDP messages received during the first time interval (e.g., "B2, B1" and "B1, B2," respectively) do not match the LLDP messages received during the second time interval (e.g., "C3, B2, B1" and "A0, B1, B2," respectively). This may indicate a possibility that endpoint network device A and/or endpoint network device C have not yet received network topology information regarding all network devices of the network path. The set of network devices may store network topology information received during the second time interval.

As further shown in FIG. 1, at a third time interval (e.g., "Time 2"), the set of network devices may transmit a third set of messages identifying network topology information. For example, endpoint network device A may transmit "A0" to intermediate network device B. Intermediate network device B transmit "A0, B1, B2" to endpoint network device C. Endpoint network device C may transmit "C3" to intermediate network device B. And, intermediate network device B may transmit "C3, B2, B1" to endpoint network device A.

Endpoint network device A and/or endpoint network device C may determine that the LLDP messages received during the second time interval (e.g., "C3, B2, B1" and "A0, B1, B2," respectively) match LLDP messages received during the third time interval (e.g., "C3, B2, B1" and "A0, B1, B2,"). This may indicate that there are no remaining network devices of the network path for which to receive network topology information. Based on determining that there are no remaining network devices for which to receive network topology information, endpoint network device A and/or endpoint network device C may transmit network topology information to the network management device (e.g., LLDP messages identifying the network topology of the network path as "A0, B1, B2, C3").

In another example, endpoint network device A and/or endpoint network device C may transmit network topology information to the network management device at each time interval, and the network management device may determine that there are no remaining network devices of the network path for which to receive network topology information. Based on receiving the information identifying the network topology of the network path, the network management device may provide the information identifying the network topology for display, may adjust a configuration of the network, or the like.

In this way, a set of network devices exchange network topology information, utilizing a mandatory and configurable portions of an LLDP message to propagate portions of the network topology information. Moreover, the set of network devices may provide the network topology information to a network management device without the network management device being directly connected to each network device of the set of network devices.

Figure 2:
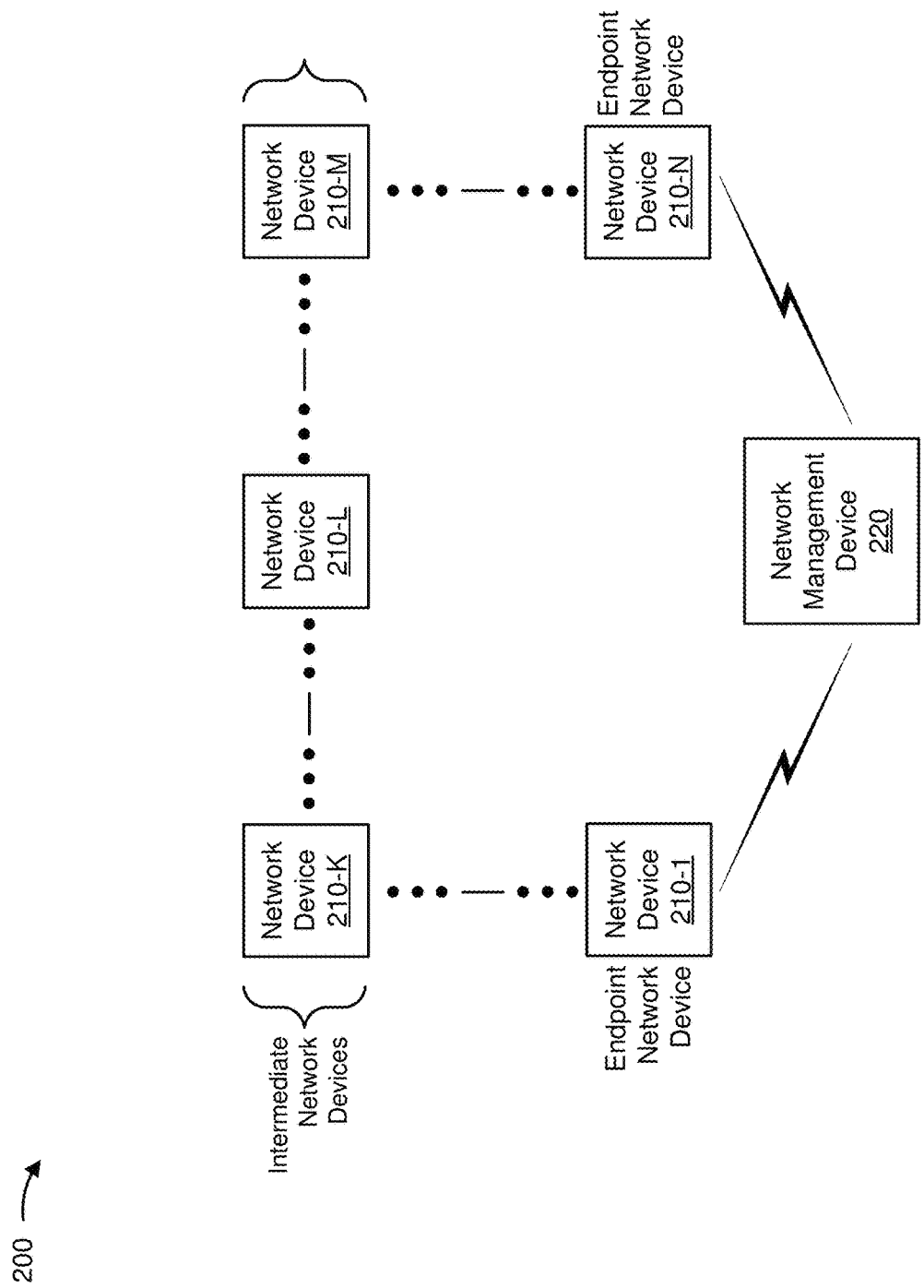
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-N (N≥1) (hereinafter referred to collectively as "network devices 210," and individually as "network device 210") and a network management device 220. Network device 210 and network management device 220 may be associated with one or more networks. Devices of environment 200 may interconnect via wired connections, wireless connections, or a combination of wired and wireless connections.

Network device 210 may include one or more devices capable of generating, storing, receiving, processing, and/or providing information associated with a network topology. For example, network device 210 may include a firewall, a router, a gateway, a switch, a hub, a bridge, a reverse proxy, a server (e.g., a proxy server), a multiplexer, a demultiplexer, an optical add-drop multiplexer, or a similar device that routes network traffic. In some implementations, network device 210 may utilize one or more communications protocols for transmitting and/or receiving information. For example, network device 210 may utilize an LLDP based communication protocol or another communications protocol that permits inclusion of information identifying a network topology.

When a first network device 210 is an endpoint of a network path including a set of network devices 210 (e.g., an initial network device 210 of the network path, a final network device 210 of the network path, etc.), the first network device 210 may be termed an endpoint network device 210. In some implementations, the endpoint network device 210 may be associated with a connection to network management device 220 that permits network management device 220 to receive information regarding a network topology from endpoint network device 210. A set of other network devices 210 of the network path may be termed a set of intermediate network devices 210. In some implementations, the set of intermediate network devices 210 may lack a connection to network management device 220, and network management device 220 may not be permitted to request and receive information regarding a network topology from the set of intermediate network devices 210.

Network management device 220 may include one or more devices capable of receiving, generating, storing, processing, and/or providing information associated with a network. For example, network management device 220 may include a computing device, such as a server, a controller, an optical performance monitor device, or a similar type of device. Network management device 220 may assist a user in modeling, planning, and/or controlling a network, such as the network including network devices 210. For example, network management device 220 may assist in modeling and/or planning a network configuration, which may include quantities, locations, capacities, parameters, and/or configurations of network devices 210. In some implementations, network management device 220 may cause data to be routed via a network path of the network (e.g., via a particular subset of network devices 210 of a set of network devices 210) based on a network topology of the network. In some implementations, network management device 220 may utilize one or more communications protocols for transmitting and/or receiving information.

Network device 210 and/or network management device 220 may be associated with one or more networks, in some implementations. Similarly, a network, of the one or more networks, may include one or more network devices 210 and/or network management devices 220. In some implementations, the one or more networks may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
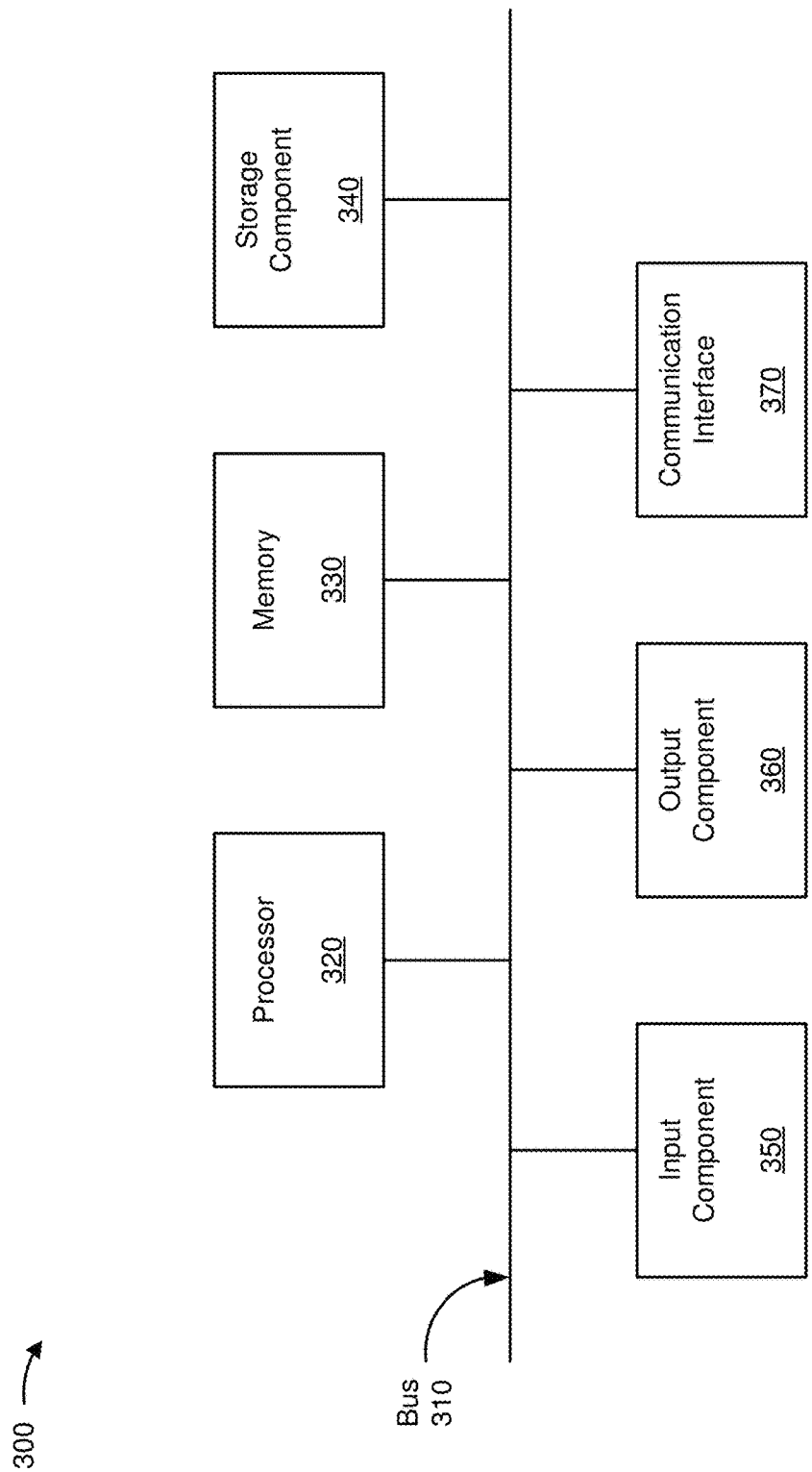
FIG. 3 is a diagram of example components of one or more devices of FIG. 2.

FIG. 3 is a diagram of example components of a device 300. Device 300 may correspond to network device 210 and/or network management device 220. In some implementations, network device 210 and/or network management device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for determining a network topology associated with a set of network devices. In some implementations, one or more process blocks of FIG. 4 may be performed by network device 210. In some implementations, one or more process blocks of FIG. 4 may be performed by another device or a group of devices separate from or including network device 210, such as network management device 220.

As shown in FIG. 4, process 400 may include detecting a trigger to provide network topology information (block 410). For example, network device 210 may detect the trigger to provide network topology information. Network topology information may refer to information identifying a portion of a network topology, such as information identifying network device 210 (e.g., a chassis identifier), information identifying one or more network ports associated with network device 210 (e.g., a set of port identifiers), information identifying a portion of a network topology associated with another network device 210 (e.g., a chassis identifier for the other network device 210, a set of port identifiers for the other network device 210, etc.), or the like. In some implementations, network device 210 may detect the trigger to provide the network topology information based on determining that a threshold period of time has elapsed. For example, after a threshold period of time has elapsed (e.g., from a set of network devices 210 being activated, from a previous trigger to provide previous network topology information, etc.), network device 210 may determine to provide the network topology information.

In some implementations, network device 210 may detect the trigger to provide the network topology information based on receiving a request for the network topology information. For example, network device 210 (e.g., endpoint network device 210) may receive a request for the network topology information from network management device 220, and may determine the network topology information based on receiving the request. In some implementations, network device 210 may detect the trigger to provide the network topology information based on receiving network topology information. For example, endpoint network device 210 may determine that endpoint network device 210 has received network topology information regarding one or more network devices 210 of a network path. In this case, endpoint network device 210 may be triggered to generate a network topology message identifying the network topology information regarding a set of network devices 210 of the network path and provide the network topology message to network management device 220.

As further shown in FIG. 4, process 400 may include generating a network topology message with network topology information (block 420). For example, network device 210 may generate a network topology message that includes network topology information based on detecting the trigger to provide network topology information. In some implementations, network device 210 may determine the network topology information. For example, based on detecting the trigger to provide network topology information, network device 210 may obtain stored information identifying a portion of a network topology, such as information associated with network device 210, information associated with one or more other network devices 210, or the like.

In some implementations, network device 210 may generate the network topology message with information identifying a portion of a network topology relating to network device 210. For example, network device 210 may generate an LLDP message that includes a set of mandatory type-length value (TLV) fields relating to network device 210, such as a chassis identifier TLV, a port identifier TLV, or the like. In this case, network device 210 may include the set of mandatory TLV fields in the LLDP message based on the set of mandatory TLV fields being required for each LLDP message that network device 210 provides. In this way, network device 210 generates a network topology message that identifies a portion of the network topology relating to network device 210.

In some implementations, network device 210 may generate the network topology message with information identifying a portion of a network topology relating to another network device 210. For example, network device 210 may receive network topology information from another network device 210 and may store the network topology information, as described herein with regards to blocks 440 and 450. In this case, network device 210 may generate an LLDP message that includes a set of optional TLV fields relating to one or more other network devices 210.

In some implementations, network device 210 may include information identifying the one or more other network devices 210 and/or a set of network ports associated with the one or more other network devices 210. For example, network device 210 may receive an LLDP message from another network device 210 including a set of mandatory TLV fields identifying the other network device 210 (e.g., a chassis identifier, a port identifier, etc.) or a set of optional TLV fields identifying the other network device 210 (e.g., a chassis identifier and a port identifier for another port of other network device 210), and may store information identifying the other network device 210. In this case, network device 210 may include the stored information identifying the other network device 210 in the LLDP message.

In some implementations, network device 210 may include the network topology information associated with the other network device 210 in a configurable portion of the network topology message. For example, network device 210 may include a set of optional TLV fields in a portion of an LLDP message allocated for organizationally specific TLV fields. The set of optional TLV fields may include a type portion indicating that the set of optional TLV fields includes network topology information associated with another network device 210. The set of optional TLV fields may include a value portion including the network topology information associated with the other network device 210. In this way, network device 210 facilitates propagation of received network topology information by including the received network topology information in a configurable portion of a network topology message, such as an organizationally specific TLV field of an LLDP message.

In some implementations, network device 210 may generate multiple different network topology messages. For example, when network device 210 communicates with a first neighboring network device 210 via a first network port (e.g., a leftward direction) and a second neighboring network device 210 via a second network port (e.g., a rightward direction), network device 210 may propagate information received from the first neighboring network device 210 to the second neighboring network device 210 and may propagate information received from the second neighboring network device 210 to the first neighboring network device 210. In this way, after a set of time intervals, a network topology associated with each intermediate network device 210 of a set of intermediate network devices 210 of a network path may be propagated to an endpoint network device 210 of the network path, thereby permitting the endpoint network device 210 to provide network topology information regarding each network device 210 of the network path to a network management device 220.

As further shown in FIG. 4, process 400 may include providing the network topology message (block 430). For example, network device 210 may provide the network topology message. In some implementations, network device 210 may provide the network topology message to another network device 210. For example, a first network device 210 may provide the network topology message to a second, neighboring network device 210 of a network path. In some implementations, network device 210 may provide multiple network topology messages to multiple network devices 210. For example, when a particular network device 210 is connected via a first network port to a first neighboring network device 210 (e.g., in a leftward direction) and via a second network port to a second neighboring network device 210 (e.g., in a rightward direction), the particular network device 210 may provide a first network topology message to the first neighboring network device 210 and a second network topology message to the second neighboring network device 210. In some implementations, the first network topology message and the second network topology message may be different network topology messages. For example, the first network topology message may include information for propagation in the leftward direction (e.g., information received from network devices 210 in a rightward direction relative to the particular network device 210) and the second network topology message may include information for propagation in the rightward direction (e.g., information received from network devices 210 in a leftward direction relative to the particular network device 210).

In some implementations, network device 210 may provide the same network topology message to multiple network management devices. For example, when the particular network device 210 is connected via a third network port to a third neighboring network device 210 (e.g., in the rightward direction), the particular network device 210 may propagate network topology information received from the first neighboring network device 210 to both the second neighboring network device 210 and the third neighboring network device 210. In this way, network device 210 propagates network topology information for a network with multiple overlapping network paths (e.g., multiple network paths sharing one or more network devices 210 in common).

In some implementations, network device 210 may provide the network topology message to network management device 220. For example, endpoint network device 210 may provide the network topology message to network management device 220. In some implementations, endpoint network device 210 may provide the network topology message to network management device 220 based on receiving a request. For example, network management device 220 may transmit a request for network topology information to one or more endpoint network devices 210, and may receive network topology messages from the one or more endpoint network devices 210. Additionally, or alternatively, endpoint network device 210 may provide the network topology message to network management device 220 based on determining that the network topology message includes network topology information regarding each network device 210 of a network path. Additionally, or alternatively, endpoint network device 210 may provide the network topology message based on determining that the network topology message indicates a change to the network topology.

In some implementations, endpoint network device 210 may provide the network topology message to network management device 220 to cause an adjustment to a parameter of a network. For example, network management device 220 may receive the network topology message and may adjust the network and/or one or more network devices 210 of the network based on a network topology of the network. Additionally, or alternatively, network management device 220 may select a network path of a set of network paths for routing information, may scheduling routing of information, or the like based on the network topology. Additionally, or alternatively, network management device 220 may provide a representation of the network topology for display, and may receive input associated with adjusting a configuration of the network based on providing the representation of the network topology for display. In this way, network device 210 provides network topology information to facilitate management, organization, and/or visualization of a network.

As further shown in FIG. 4, process 400 may include receiving another network topology message from another network device (block 440). For example, network device 210 may receive another network topology message from another network device 210. In some implementations, network device 210 may receive the other topology message concurrently with providing the network topology message. For example, a set of network devices 210 may utilize one or more synchronization techniques (e.g., clock based synchronization, message based synchronization, or the like) to ensure that network topology messages (e.g., LLDP messages) are transmitted concurrently. Additionally, or alternatively, network device 210 may receive the other network topology message based on transmitting the network topology message. For example, a first network device 210 may transmit a first network topology message to a second network device 210, and this may trigger the second network device 210 to transmit a second network topology message to first network device 210.

As further shown in FIG. 4, process 400 may include storing other network topology information included in the other network topology message (block 450). For example, network device 210 may store other network topology information included in the other network topology message. In this case, network device 210 may include the other network topology information when transmitting a network topology message at another time interval. For example, network device 210 may transmit first network topology information and may receive second network topology information at a first time interval, may store the second network topology information via a data structure, and may transmit the first network topology information and the second network topology information at a second time interval. In this way, network device 210 receives and provides network topology information.

In some implementations, network device 210 may process the other network topology information. For example, for an LLDP message, network device 210 may parse a set of mandatory TLV fields of the LLDP message to obtain network topology information about a particular neighboring network device 210 (e.g., that sent the LLDP message), and may parse a portion of the LLDP message allocated for organizationally specific (optional) TLV fields to obtain network information regarding other network devices 210 (e.g., a neighboring network device 210 of the particular neighboring network device 210). In this case, network device 210 may store the network topology information regarding the particular neighboring network device 210 and the other network devices 210 via a data structure for encapsulation in another network topology message.

In some implementations, network device 210 may remove duplicate information from the data structure. For example, at a first time interval, a first network device 210 may receive and store information regarding a second network device 210 and, at a second time interval, first network device 210 may receive information regarding second network device 210 and a third network device 210. In this case, first network device 210 may append the information regarding the third network device 210 to stored information regarding second network device 210, thereby reducing memory storage requirements relative to storing all received network topology information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5D are diagrams of an example implementation 500 relating to example process 400 shown in FIG. 4. FIGS. 5A-5D show an example of determining a network topology associated with a set of network devices.

Figure 5A:
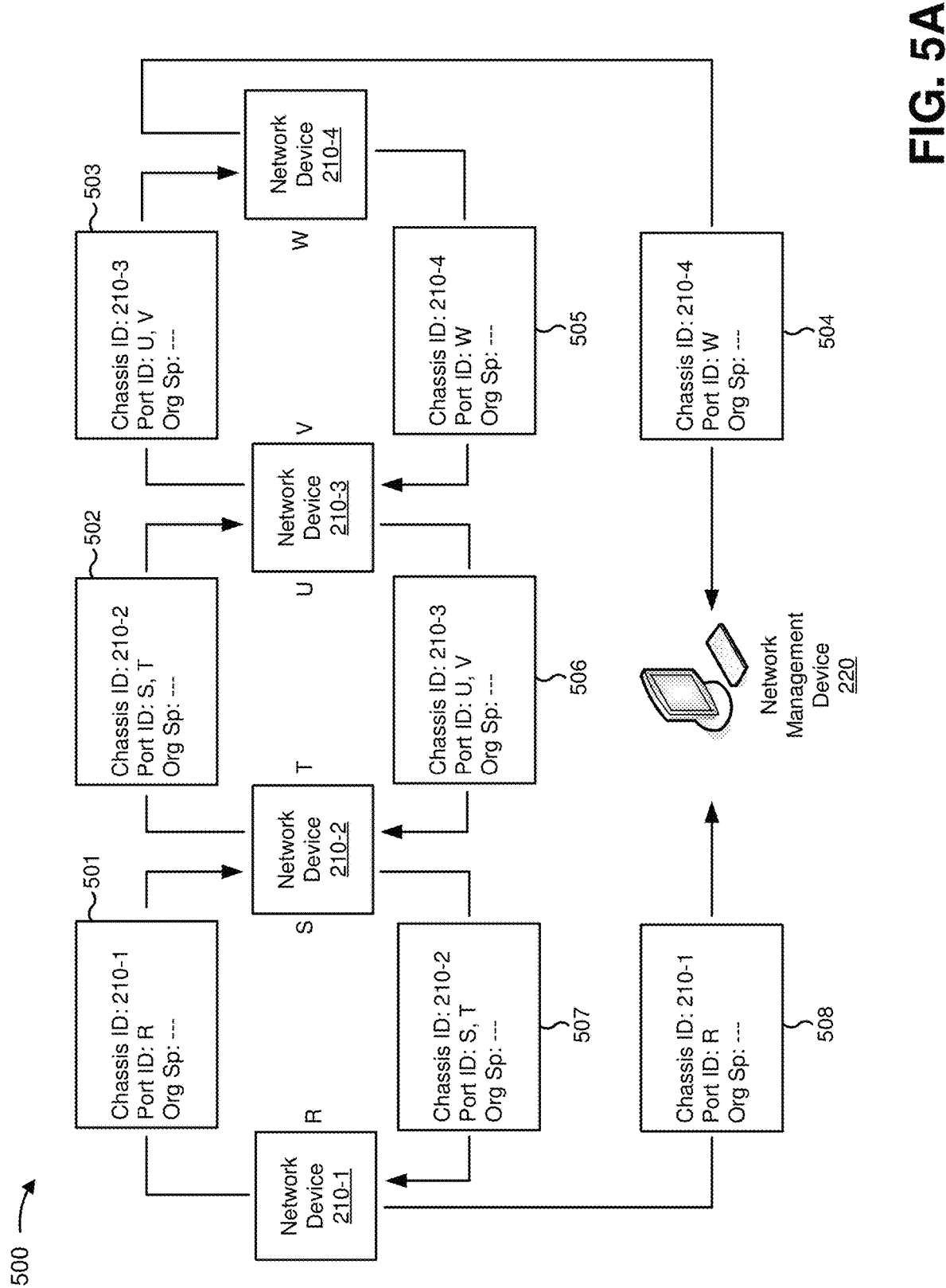
FIGS. 5A-5D are diagrams of an example implementation relating to the example process shown in FIG. 4.

As shown in FIG. 5A, a network path may include a set of network devices 210-1 through 210-4 and a network management device 220. Assume that the set of network devices 210 have generated a set of LLDP messages 501-508 for transmission at a first time interval. As shown by reference number 501, network device 210-1 transmits LLDP message 501, which includes network topology information for propagation in the rightward direction. The network topology information is encapsulated by a TLV field identifying network device 210-1 (e.g., "Chassis ID: 210-1"), a TLV field identifying a network port of network device 210-1 (e.g., "Port ID: R"), and an organizationally specific TLV field that does not include any information (e.g., "Org Sp: --"). In another example, network device 210-1 may omit the organizationally specific TLV field when the organizationally specific TLV field does not include information. As shown by reference numbers 502 through 508, the set of network devices 210 transmit other LLDP messages of the set of LLDP messages. Assume that each network device 210, of the set of network devices 210, and network management device 220 store network topology information received via the set of LLDP messages. In this way, each network device 210 propagates network topology information.

Figure 5B:
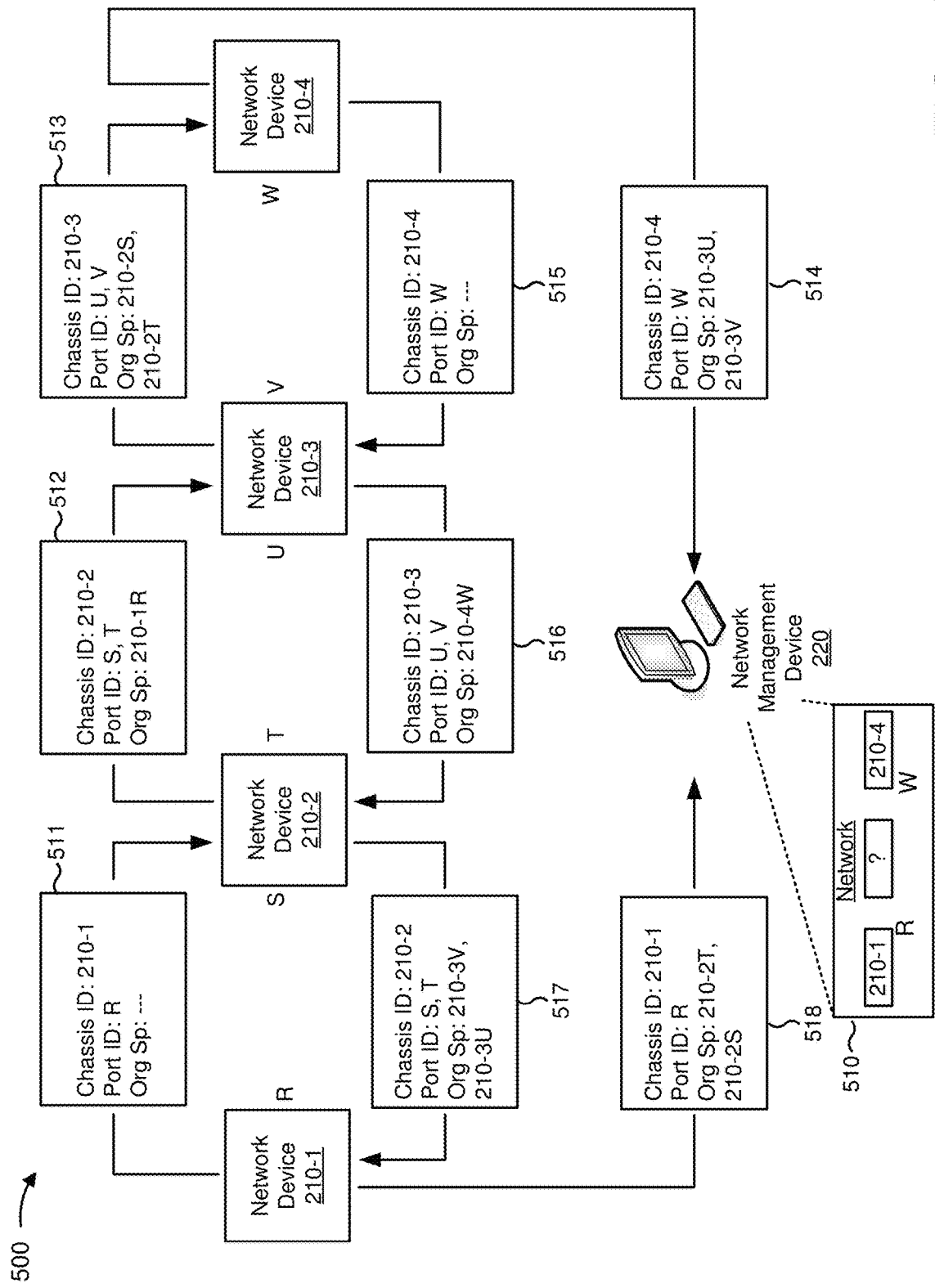

As shown in FIG. 5B, and by reference number 510, network management device 220 provides received network topology information for display. Based on receiving LLDP messages 504 and 508 from network devices 210-4 and 210-1, respectively, network management device 220 identifies network device 210-1, possibility one or more intermediate network devices 210 (e.g., "?"), and network device 210-4. Assume that the set of network devices 210 have generated a set of LLDP messages 511-518 for transmission at a second time interval. As shown by reference number 511, network device 210-1 transmits LLDP message 511 to network device 210-2. LLDP message 511 includes the same information as LLDP message 501 for propagation in the rightward direction (network device 210-1 did not receive a message for propagation in the rightward direction at the first time interval).

As further shown in FIG. 5B, and by reference number 512, network device 210-2 transmits LLDP message 512 to network device 210-3 for propagation in the rightward direction, which includes the same chassis identifier TLV field and port identifier TLV field as LLDP message 502 and which includes an organizationally specific TLV field (e.g., "Org Sp: 210-1R") that encapsulates network topology information received from network device 210-1 via LLDP message 501 (e.g., information identifying network device 210-1 and identifying network port R of network device 210-1). As shown by reference numbers 513-517, the set of network devices 210 propagate LLDP messages 513-517. In this way, the set of network devices 210 propagate network topology information, in a second time interval, that was received during a first time interval. As shown by reference number 518, network device 210-1 transmits LLDP message 518 in the leftward direction to network management device 220. LLDP message 518 includes the same chassis identifier TLV field and port identifier TLV field as LLDP message 508 and includes an organizationally specific TLV field (e.g., "Org Sp: 210-2V, 210-2U") that includes network topology information received from network device 210-2 via LLDP message 507 (e.g., information identifying network device 210-2 and network Ports V and U or network device 210-2).

Figure 5C:
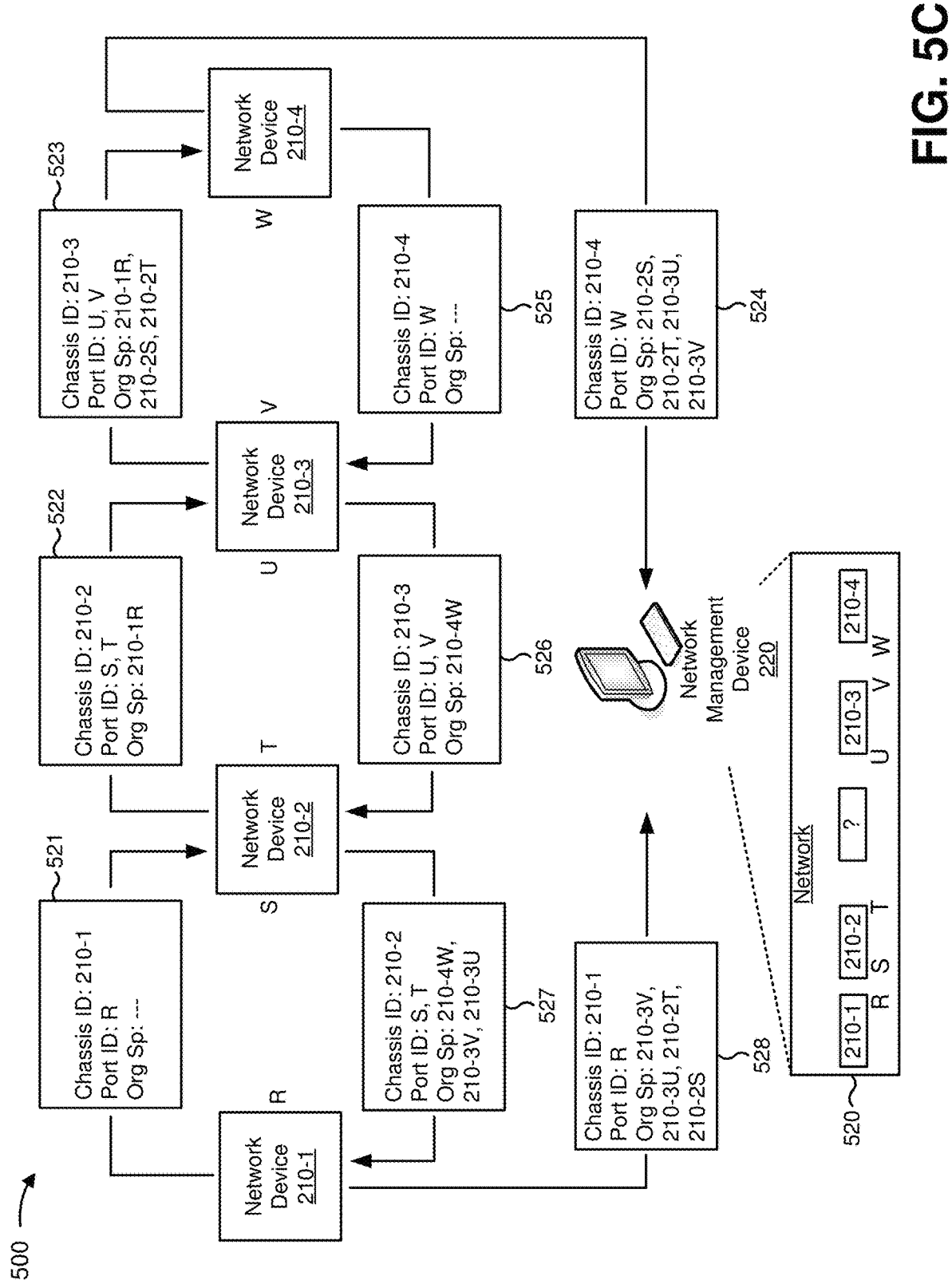

As shown in FIG. 5C, and by reference number 520, network management device 220 provides received network topology information for display. Based on receiving messages 514 and 518 from network devices 210-4 and 210-1, respectively, network management device 220 identifies network device 210-1, network device 210-2, possibility one or more other intermediate network devices 210 (e.g., "?"), network device 210-3, and network device 210-4. Although no intermediate network device 210 is located between network device 210-2 and network device 210-3, network management device 220 has not received information during the first time interval or the second time interval confirming the lack of an intermediate network device 210. Assume that the set of network devices 210 have generated a set of LLDP messages 521-528 for transmission at a third time interval.

As further shown in FIG. 5C, and by reference number 521, network device 210-1 transmits LLDP message 521 to network device 210-2 as LLDP message 501 and LLDP message 511 for propagation in the rightward direction (network device 210-1 did not receive a message for propagation in the rightward direction at the first time interval or the second time interval). As shown by reference number 522, network device 210-2 transmits an LLDP message 522 to network device 210-3 which includes the same information as LLDP message 512 based on network device 210-2 having received the same network topology information from network device 210-1 at the first time interval via LLDP message 501 and the second time interval via LLDP message 511.

As further shown in FIG. 5C, and by reference numbers 523-527, the set of network devices 210 propagate LLDP messages 523-527. As shown by reference number 528, network device 210-1 transmits LLDP message 528, which includes the same chassis identifier and port identifier as LLDP messages 508 and 518. However, LLDP message 528 includes an organizationally specific TLV field (e.g., "Org Sp: 210-3V, 210-3U, 210-2T, 210-2S") that includes network topology information received from network device 210-2 via LLDP message 517 (e.g., network topology information regarding network device 210-2 and network device 210-3). In this way, the set of network devices 210 propagate network topology information, in a third time interval, that was received during a second time interval.

Figure 5D:
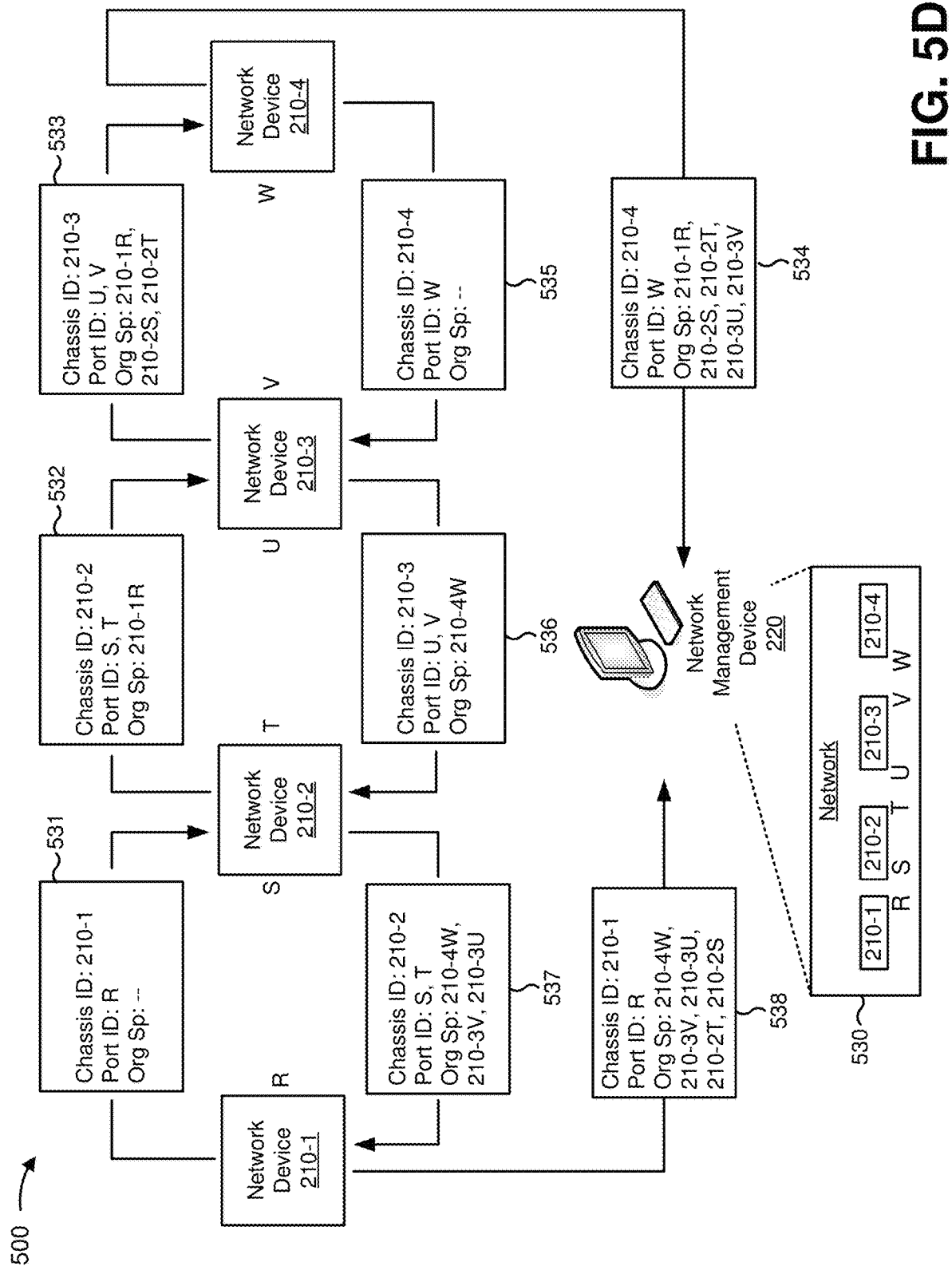

As shown in FIG. 5D, and by reference number 530, network management device 220 provides received network topology information for display. Based on receiving messages 524 and 528 from network devices 210-4 and 210-1, respectively, network management device 220 identifies network device 210-1, network device 210-2, network device 210-3, and network device 210-4 (without indicating a possibility of another intermediate network device 210 based on LLDP messages 504, 508, 514, 518, 524, and 528 collectively indicating that there is no intermediate network device 210 located between network device 210-2 and network device 210-3). In this way, network management device 220 provides a visualization of a network path of a network based on receiving network topology information from endpoint network devices 210 (and without being directly connected to any intermediate network devices 210).

As further shown in FIG. 5D, and by reference numbers 531-538, the set of network devices 210 continue to exchange LLDP messages 531-538 even after network management device 220 has received the information identifying the network topology for each network device 210 of the network. In another example, network device 210-1 may avoid transmitting network topology information to network management device 220 until network device 210-1 is capable of transmitting the complete network topology information, such as after receiving LLDP message 538 or a subsequent message matching LLDP message 538. In this way, network device 210-1 reduces a quantity of network traffic relative to transmitting multiple LLDP messages with partial network topology information to network management device 220.

In another example, when the network topology changes (e.g., a network device 210 is added, a network device 210 is removed, a network port is disabled, or the like), network management device 220 may receive information regarding the change to the network topology after the information is propagated during a particular quantity of time intervals. In other words, if network device 210-2 is removed, at a first time interval, network device 210-1 receives an LLDP message from network device 210-3 identifying network device 210-3 and, at a second time interval, network device 210-1 provides an LLDP message to network management device 220 identifying network device 210-3 and network device 210-1, thereby indicating the removal of network device 210-2.

As indicated above, FIGS. 5A-5D are provided merely as an example. Other examples are possible and may differ from what was described with regard to FIGS. 5A-5D.

In this way, network device 210 utilizes a configurable portion of a network topology message (e.g., an organizationally specific TLV field of an LLDP message) to provide information identifying a portion of the network topology associated with a set of other network devices 210. Moreover, based on propagating network topology information for each network device 210 to endpoint network devices 210, the endpoint network devices 210 can provide network topology information to network management device 220 for each network device 210 of a network path, thereby permitting network management device 220 to determine the network topology without network management device 220 being capable of communication with one or more network devices 210 of the set of network devices 210.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory; and
   one or more processors to:
      receive a first network topology message from a first network device,
         the first network topology message including:
            first network topology information relating to the first network device, and
            second network topology information relating to at least a second network device and received by the first network device;
      receive a second network topology message from a third network device,
         the second network topology message including:
            third network topology information relating to the third network device, and
            fourth network topology information relating to at least a fourth network device and received by the third network device;
      generate a third network topology message,
         the third network topology message including:
            fifth network topology information associated with the device in a first set of fields of the third network topology message, and
            the first network topology information relating to the first network device and the second network topology information, relating to at least the second network device and received by the first network device, in a second set of fields of the third network topology message;
      generate a fourth network topology message,
         the fourth network topology message including:
            the fifth network topology information in a first set of fields of the fourth network topology message, and
            the third network topology information relating to the third network device and the fourth network topology information, relating to at least the fourth network device and received by the third network device, in a second set of fields of the fourth network topology message;
      provide the third network topology message to the third network device,
         the third network topology message being provided to the third network device concurrently with the second network topology message being received from the third network device, and
         information included in the third network topology message to be sent to a network management device; and
      provide the fourth network topology message to the first network device,
         the fourth network topology message being provided to the first network device concurrently with the first network topology message being received from the first network device, and
         information included in the fourth network topology message to be sent to the network management device.

2. The device of claim 1, where the network management device is not directly connected to the device.

3. The device of claim 1, where the fourth network topology message is a link layer discovery protocol (LLDP) message;

where the first set of fields are a first set of type-length value (TLV) fields including a chassis identifier TLV field and a port identifier TLV; and
where the second set of fields are a second set of TLV fields,
the second set of TLV fields being a set of organizationally specific TLV fields.

4. The device of claim 1, where the one or more processors, when receiving the first network topology message, are to:
receive the first network topology message via a first network port of the device; and
where the one or more processors, when receiving the second network topology message, are to:
receive the second network topology message from the third network device via a second network port of the device.

5. The device of claim 1, where the one or more processors when providing the fourth network topology message, are to:
provide the fourth network topology message to cause an adjustment to a network,
the network including the first network device, the second network device, the third network device, the fourth network device, and the device.

6. The device of claim 1, where the device, the first network device, and the second network device are associated with a same network path.

7. The device of claim 1, where the first network topology information, associated with the first network device, includes information identifying a first set of network ports associated with the first network device, and
where the third network topology information, associated with the third network device, includes information identifying a second set of network ports associated with the third network device.

8. A non-transitory computer-readable medium storing instructions, the instructions comprising:
one or more instructions that, when executed by one or more processors of a device, cause the one or more processors to:
receive a first link layer discovery protocol (LLDP) message from a first network device,
the first LLDP message including:
first network topology information identifying the first network device,
the first network topology information, identifying the first network device, being included in an organizationally specific type-length value (TLV) field of the first LLDP message, and
second network topology information identifying at least a second network device and received by the first network device, and
the device lacking a connection to a network management device;
receive a second LLDP message from a third network device,
the second LLDP message including:
third network topology information identifying the third network device, and
fourth network topology information identifying at least a fourth network device and received by the third network device;
generate a third LLDP message,
the third LLDP message including:
fifth network topology information associated with the device in a first set of fields of the third LLDP message, and
the first network topology information identifying the first network device and the second network topology information, identifying at least the second network device and received by the first network device, in a second set of fields of the third LLDP message;
generate a fourth LLDP message,
the fourth LLDP message including:
the fifth network topology information in a first set of fields of the fourth LLDP message, and
the third network topology information identifying the third network device and the fourth network topology information, identifying at least the fourth network device and received by the third network device, in a second set of fields of the fourth LLDP message;
provide the third LLDP message to the third network device,
the third LLDP message being provided to the third network device concurrently with the second LLDP message being received from the third network device, and
information included in the third LLDP message to be sent to the network management device; and
provide the fourth LLDP message to the first network device,
the fourth LLDP message being provided to the first network device concurrently with the first LLDP message being received from the first network device, and
information included in the fourth LLDP message to be sent to the network management device.

9. The non-transitory computer-readable medium of claim 8, where at least one of the third network device or the first network device is directly connected to network management device.

10. The non-transitory computer-readable medium of claim 8, where the network management device is associated with providing at least one of the first network topology information, the second network topology information, or the third network topology information for display; and
where the network management device is not communicatively connected to the device.

11. The non-transitory computer-readable medium of claim 8, where the one or more instructions, when executed by the one or more processors, further cause the one or more processors to:
determine that a threshold period of time has elapsed; and
receive, based on determining that the threshold period of time has elapsed, a trigger to provide at least one of:
the first network topology information identifying the first network device,
the second network topology information identifying at least the second network device and received by the first network device,
the third network topology information identifying the third network device,
the fourth network topology information identifying at least the fourth network device and received by the third network device, or
the fifth network topology information associated with the device.

12. The non-transitory computer-readable medium of claim 8, where the one or more instructions, when executed by the one or more processors, further cause the one or more processors to:
receive, based on receiving the first LLDP message, a trigger to provide at least one of:
the first network topology information identifying the first network device,
the second network topology information identifying at least the second network device and received by the first network device, or
the fifth network topology information associated with the device; and
where the one or more instructions, that cause the one or more processors to provide the third LLDP message to the third network device, cause the one or more processors to:
provide, based on receiving the trigger, the third LLDP message to the third network device.

13. The non-transitory computer-readable medium of claim 8, where the one or more instructions, when executed by the one or more processors, further cause the one or more processors to:
receive a request for at least one of:
the third network topology information identifying the third network device,
the fourth network topology information identifying at least the fourth network device and received by the third network device, or
the fifth network topology information associated with the device;
receive, based on the request, a trigger to provide the at least one of:
the third network topology information identifying the third network device,
the fourth network topology information identifying at least the fourth network device and received by the third network device, or
the fifth network topology information associated with the device; and
where the one or more instructions, that cause the one or more processors to provide the fourth LLDP message to the first network device, cause the one or more processors to:
provide, based on receiving the trigger, the fourth LLDP message to the first network device.

14. The non-transitory computer-readable medium of claim 8, where the third LLDP message includes a field including a portion of network topology information associated with the third network device.

15. A method, comprising:
receiving, by a device and from a first network device, a first message including:
first network topology information associated with the first network device, and
second network topology information associated with at least a second network device and received by the first network device;
receiving, by the device and from a third network device, a second message including:
third network topology information associated with the third network device, and
fourth network topology information associated with at least a fourth network device and received by the third network device;
generating, by the device, a third message,
the third message including:
fifth network topology information, associated with the device, in a first set of fields of the third message,
the first network topology information associated with the first network device and the second network topology information, associated with at least the second network device and received by the first network device, in a second set of fields of the third message;
generating, by the device, a fourth message,
the fourth message including:
the fifth network topology information in a first set of fields of the fourth message, and
the third network topology information associated with the third network device and the fourth network topology information, associated with at least the fourth network device and received by the third network device, in a second set of fields of the fourth message;
providing, by the device, the third message to the third network device,
the third message being provided to the third network device concurrently with the second message being received from the third network device; and
providing, by the device, the fourth message to the first network device,
the fourth message being provided to the first network device concurrently with the first message being received from the first network device.

16. The method of claim 15, further comprising:
identifying a mandatory field of the fourth message;
obtaining, from the mandatory field, a portion of the fifth network topology information associated with the device;
identifying an optional field of the fourth message; and
obtaining, from the optional field, a portion of the fourth network topology information associated with at least the fourth network device and received by the third network device,
the portion of the fourth network topology information, associated with at least the fourth network device and received by the third network device, being associated with at least the fourth network device to which the device is not connected.

17. The method of claim 15, where a mandatory field of the fourth message is a set of mandatory link layer discovery protocol (LLDP) type-length value (TLV) fields and an optional field of the fourth message is a set of organizationally specific LLDP TLV fields.

18. The method of claim 15, further comprising:
requesting the first network topology information, associated with the first network device, from an endpoint network device of a set of network devices; and
where receiving the first message comprises:
receiving the first message from the endpoint network device as a response to requesting the first network topology information associated with the first network device.

19. The method of claim 15, further comprising:
receiving user input based on providing the third message and the fourth message; and
causing an adjustment to a set of network devices based on the user input.

20. The method of claim 15, where the first network topology information, associated with the first network device, includes information identifying a first set of network ports associated with the first network device, and
  where the third network topology information, associated with the third network device, includes information identifying a second set of network ports associated with the third network device.

* * * * *